United States Patent
Armstrong (10) Patent No.: US 8,131,590 B1
(45) Date of Patent: Mar. 6, 2012

(54) SYSTEM AND METHODS FOR PURCHASE REWARD INVESTMENT COMMUNITIES

(75) Inventor: Michael D. Armstrong, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 528 days.

(21) Appl. No.: 11/783,051

(22) Filed: Apr. 5, 2007

(51) Int. Cl.
*G06Q 30/00* (2012.01)
*G06Q 40/00* (2012.01)

(52) U.S. Cl. .............. 705/14.18; 705/14.11; 705/14.17; 705/35; 705/37

(58) Field of Classification Search ............. 705/14, 705/35, 37, 14.11, 14.17, 14.18
See application file for complete search history.

(56) References Cited

U.S. PATENT DOCUMENTS

| | | | | |
|---|---|---|---|---|
| 5,787,404 A | * | 7/1998 | Fernandez-Holmann | 705/35 |
| 5,970,480 A | * | 10/1999 | Kalina | 705/37 |
| 5,991,736 A | * | 11/1999 | Ferguson et al. | 705/14 |
| 6,070,153 A | * | 5/2000 | Simpson | 705/36 R |
| 6,243,688 B1 | * | 6/2001 | Kalina | 705/14 |
| 6,345,261 B1 | * | 2/2002 | Feidelson et al. | 705/14 |
| 6,895,386 B1 | * | 5/2005 | Bachman et al. | 705/14 |
| 6,941,279 B1 | * | 9/2005 | Sullivan | 705/35 |
| 7,010,509 B2 | * | 3/2006 | Hillman et al. | 705/35 |
| 7,219,071 B2 | * | 5/2007 | Gallagher | 705/14 |
| 2002/0007335 A1 | * | 1/2002 | Millard et al. | 705/37 |
| 2002/0046110 A1 | * | 4/2002 | Gallagher | 705/14 |
| 2002/0052818 A1 | * | 5/2002 | Loveland | 705/36 |
| 2003/0004803 A1 | * | 1/2003 | Glover et al. | 705/14 |
| 2004/0083183 A1 | * | 4/2004 | Hardesty et al. | 705/65 |
| 2004/0210505 A1 | * | 10/2004 | Pourhamid | 705/37 |
| 2007/0288340 A1 | * | 12/2007 | Kravitz et al. | 705/36 R |
| 2008/0228580 A1 | * | 9/2008 | Korman et al. | 705/14 |

OTHER PUBLICATIONS

Jack Friedman, "Dictionary of Business Terms," 2000, 3rd Ed., p. 627.*

* cited by examiner

*Primary Examiner* — Jagdish Patel
*Assistant Examiner* — Kenneth Bartley
(74) *Attorney, Agent, or Firm* — Hunton & Williams LLP (57) ABSTRACT

Purchase rewards account holders accumulate rewards currency. A network-based investment management system allows account holders to purchase shares in investments using reward currency. When all the shares for a particular investment have been purchased, the underlying investment is acquired. Account holders owning shares in an investment may sell shares to other account holders through the system. Account holders are thereby able to invest their rewards dollars in investments typically requiring cash or cash equivalents and to grow their rewards currency.

17 Claims, 9 Drawing Sheets

---

500

Available Investments

Click any for details

1) Security Z (IPO) – open – $10 per share
2) Los Angeles Strip Mall – open – $100 per share
3) Miami Condominium – open - $20 per share
4) Credit Card backed Security – closed - $50 per share
   Tier 1
5) Credit Card Backed Security – open - $50 per share
   Tier 2

Close

SYSTEM AND METHODS FOR PURCHASE REWARD INVESTMENT COMMUNITIES

FIELD OF THE INVENTION

The present invention relates generally to network-based financial management and more particular to systems and methods for facilitating purchase reward investment communities.

BACKGROUND OF THE INVENTION

Purchase rewards have become popular as way of increasing customer loyalty in the credit card industry. Some card issuers grant rewards monthly based on customer purchases. These rewards accumulate in an account and may be converted to cash, in the form of a rebate or used to purchase goods or services from the card issuer or a card issuer partner or affiliate (e.g., airline, hotel chain, car rental chain, retailer, etc.).

A shortcoming of rewards, however, is that unless they are received in the form of a cash rebate, there are limits in the way that they can be used. Also, to date, there are no effective ways to grow purchase rewards without increasing the purchase activity of the reward card. Furthermore, rewards typically only amount to a small percentage (i.e. 1 percent) of the purchase activity on a card. Thus, for any one account holder, the amount of accumulated rewards is so small as to preclude investment of rewards in certain types of investments that require minimum investments that can be quite high as compared to the amount of purchase rewards a typically card holder might accumulate in a year.

Accordingly, there is a need for a purchase reward system that ameliorates some or all of the shortcomings of conventional rewards programs. Purchase rewards have become popular as way of increasing customer loyalty in the credit card industry. Some card issuers grant rewards monthly based on customer purchases. These rewards accumulate in an account and may be converted to cash, in the form of a rebate or used to purchase goods or services from the card issuer or a card issuer partner or affiliate (e.g., airline, hotel chain, car rental chain, retailer, etc.).

SUMMARY OF THE INVENTION

In view of the foregoing, various embodiments of the invention may provide system and methods for facilitating purchase reward investment communities. In at least one embodiment, this may be implemented as a network-based system for allowing reward recipients to invest their rewards collectively. The system according to this embodiment may comprise an account interface system that allows account holders to remotely view a reward balance associated with at least one financial account, an investment database storing information corresponding to a plurality of available investments, and an investment management system that adapted to enable reward recipients to allocate at least a portion of their reward balance to one or more of the plurality of available investments.

Another embodiment may provide a method for permitting customers of a financial institution to invest purchase rewards. The method according to this embodiment may comprise providing a network-based account management system that enables account holders to remotely view a purchase reward balance associated with each account holder's financial account, providing an investment database that permits account holders to view details of one or more available investments, and providing an investment management system that permits account holders to invest their reward balances in shares of the one or more available investments.

Still further embodiments may provide a network based reward recipient investment community. The network based reward recipient investment community according to this embodiment may comprise an account interface module that permits member account holders to view information corresponding to at least one financial account, the account information including an amount of rewards currency associated with the at least one financial account, an investment database that includes information corresponding to at least one community investment, and an investment management module that permits member account holders to invest their rewards currency in the at least one community investment.

These and other embodiments and advantages of the present invention will become apparent from the following detailed description, taken in conjunction with the accompanying drawings, illustrating by way of example the principles of the invention.

DETAILED DESCRIPTION

The following description is intended to convey a thorough understanding of the embodiments described by providing a number of specific embodiments and details involving systems and methods for purchase reward investment communities. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For purposes of this disclosure and claims the term "investment community" will be interpreted broadly to refer to members of a financial group, such as, for example, those individuals holding an account with a particular financial institution.

For purposes of this disclosure and claims the term "rewards" or "purchase rewards" will be interpreted broadly to refer to rewards points, rewards dollars, or other rewards currency that is granted based on purchases made by a consumer with one or more financial accounts, such as, for example, a credit card account, a debit account, a store card, a prepaid card, or a gas card.

For purposes of this disclosure and claims the term "investment" will be interpreted broadly to refer to any type of investment, including but not limited to a particular security (e.g., stock, bond, mutual fund, etc.), a piece of real property (e.g., house, condominium, apartment, land, etc.), a tangible asset (boat, plane, piece of art, etc.), a commodity (gold, silver, platinum), a credit card balance backed security, or an options contract.

Figure 1:
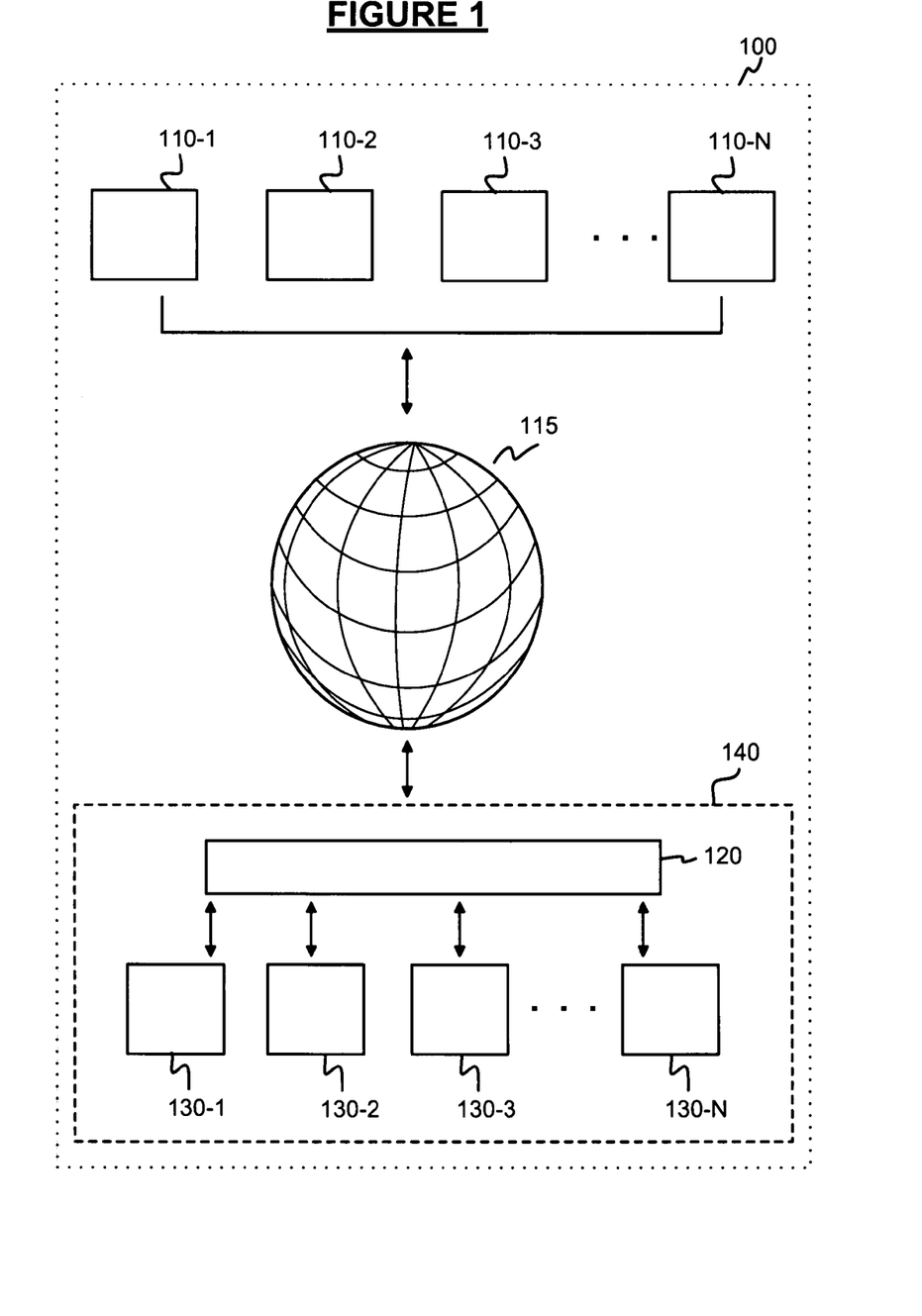
FIG. 1 is a high level block diagram illustrating components of a exemplary network-based system for purchase reward investment communities in accordance with at least one embodiment of the invention.

Referring now to FIG. 1, this Figure is a high level block diagram illustrating components of a exemplary network-based system for purchase reward investment communities in accordance with at least one embodiment of the invention. The exemplary system 100 shown in FIG. 1 includes a plurality of account holding purchase reward recipients 110-1, 110-2, 110-3, . . . , 110-N, and an investment management system 140 including an account management system 120 and a plurality of investments communities 130-1, 130-2, 130-3, . . . , 130-N. In the example of FIG. 1, the plurality of account holding purchase reward recipients 110-1, 110-2, 110-3, . . . , 110-N, the account management system 120, and the plurality of investments communities 130-1, 130-2, 130-3, . . . , 130-N are all interconnected via a network 115. The network 115 may be a public wide area network such as the Internet, or the network 115 may be another suitable network. The network 115 may include a combination of terrestrial, wireless and space-based components for relaying electronic information between the two points. The plurality of account holding purchase reward recipients 110-1, 110-2, 110-3, . . . , 110-N and the investment management system 140 may communicate with the network 115 via any suitable network connection including twisted pair copper, wireless, cable, DSL, fiber, satellite, and combinations of these.

In various embodiments, the plurality of account holding purchase reward recipients 110-1, 110-2, 110-3, . . . , 110-N will access the investment management system 140 via the network 115 using a data terminal such as a personal computer, laptop computer, palm top computer, and/or wireless computing and communication device (e.g., data enabled wireless phone), all of which may be collectively referred to here in as a "computing device." The investment management system 140 including the account management system 120 and the plurality of investment communities 130-1, 130-2, 103-3, . . . , 130-N may comprise one or more web servers associated with a unique network identification, such as, for example, a web address.

The plurality of account holding purchase reward recipients 110-1, 110-2, 110-3, . . . , 110-N may access the investment management system 140 to view details of their account(s), pay their bills, access customer service functions, to view rewards balances, and to perform investment functions, such as interacting with one or more of the plurality of investment communities 130-1, 130-2, 130-3, . . . , 130-N. The investment management system 140 may include one or modules for providing investment management functions to the plurality of account holding purchase reward recipients 110-1, 110-2, 110-3, . . . , 110-N, including allowing the plurality of account holding purchase reward recipients 110-1, 110-2, 110-3, . . . , 110-N to view available investments, to purchase shares of investments with their respective purchase rewards, and to sell shares in owned investments to other account holding rewards recipients.

The plurality of account holding purchase reward recipients 110-1, 110-2, 110-3, . . . , 110-N may comprise customers of a financial institution, such a bank or credit card issuer. The plurality of account holding purchase reward recipients 110-1, 110-2, 110-3, . . . , 110-N may also comprise members of one or more social networking communities, electronic mail communities, commerce communities or other affiliation-based communities (e.g., alumni network, employees, clubs, etc.).

Each of the plurality of investment communities 130-1, 130-2, 130-3, . . . , 130-N may comprise information corresponding to the associated investment and may also include a message board, blog, chat room or other structure to allow the reward recipient account holders to exchange information about the underlying investment and/or about other topics. Access to these message boards, blogs, chat rooms or other structures may be limited to reward recipient account holders owning shares in the underlying investment or may also be open to other account holders who do not own shares in a corresponding investment but who are merely seeking information.

In at least one embodiment, the investment management system 140 including the account management system 120 and the plurality of investment communities 130-1, 130-2, 130-3, . . . , 130-N, may comprise a credit card company's Internet-based customer interface site that is identified on the network 115 by a particular uniform resource locator (URL) otherwise known as a web address. In such applications, customers of the credit card company 110-1, 110-2, 110-3, . . . , 110-N may log on to the system 140 with their respective computing devices via the network 115 to access their account information, view rewards balances, view available investments, monitor the performance of existing investments, and to trade shares in investments, that is to buy as well as to sell shares, as is discussed in greater detail in the context of FIGS. 4-9.

Figure 2:
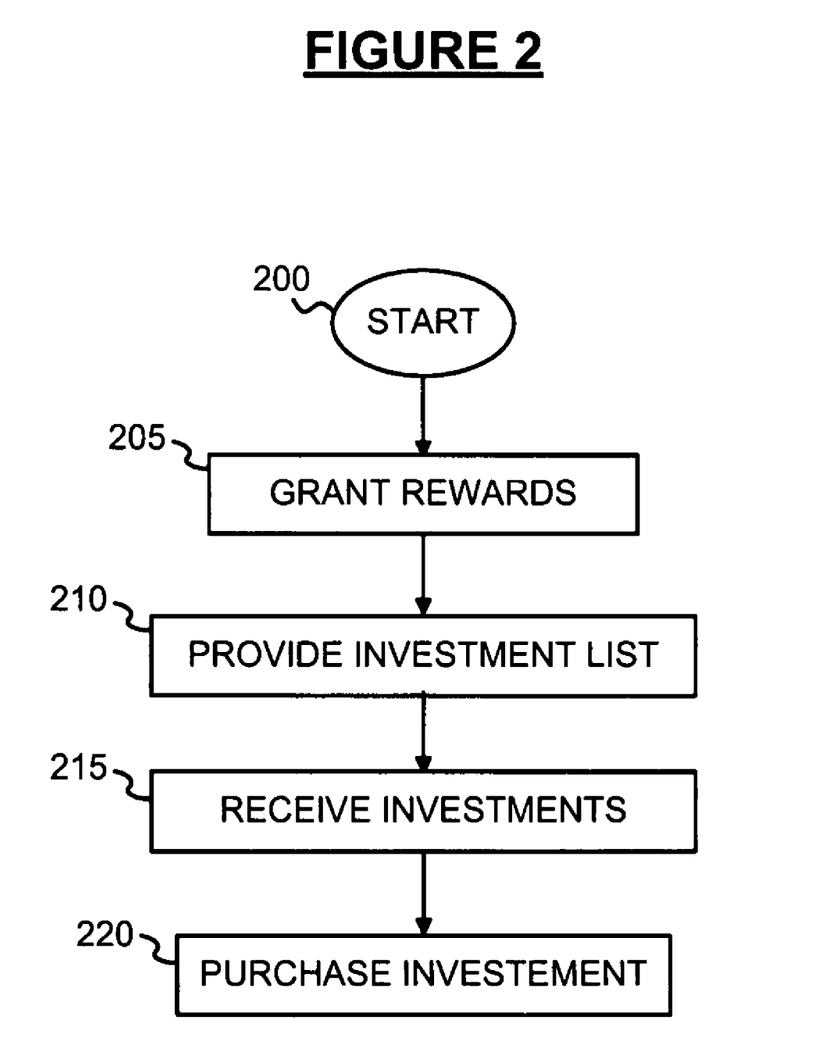
FIG. 2 is a flow chart of an exemplary method for providing purchase reward investments to account holders with a purchase reward investment management system according to at least one embodiment of the invention.

Referring now to FIG. 2, this Figure is a flow chart of an exemplary method for making investments with a purchase reward investment management system according to at least one embodiment of the invention. The process begins in block 200 and proceeds to block 205 where a rewards currency is awarded to an account holder. In various embodiments, this may comprise granting rewards currency to a holder of a financial account, such as, for example, a credit card, based on the account holder's purchases in a particular transaction period. It is known in the art that purchase rewards may accumulate through a variety of mechanisms. For example, in some cases rewards are earned on a dollar for dollar basis (e.g., one dollar of purchases equals one unit of rewards currency). Sometimes rewards are given on a performance basis, that is spending X dollars every period earns the account holder one level of rewards, while spending amount greater than X earns the account holder a greater level or percentage of rewards. Also, rewards may be granted on an accelerated basis to incite account holders to do business with one or more partner affiliates. For example, purchases made to a particular airline, hotel, car rental agency may cause rewards to accumulate at a greater rate versus purchases made at other businesses. The various systems and methods disclosed herein are compatible with any type of rewards accumulation program. Also, it is worth noting that rewards do not always accumulate in the form of dollars. The currency of rewards may be dollars, points, miles, etc. In various embodiments, the investment management system 140 may include a conversion module for converting the native currency of purchase rewards into a real currency equivalent for making investments. Thus, in block 205, a rewards balance may be appended to an account associated with a reward recipient account holder.

With continued reference to FIG. 2, in block 210, an account holder may be provided with a list of investments. In various embodiments, this may include investments that are open, that is that are not fully funded, as well as investments that are funded, that is, that have been funded by account holders exchanging rewards currency for shares in the underlying investment. As discussed herein, the investments may comprise securities, real property investments, tangible property investments, commodity investments, and even credit card backed securities. In various embodiments, each unfunded investment may include a link to a detail page for that investment that provides information such as the underlying value, share price, amount of remaining shares, relative risk level associated with the investment, etc. In the case of already funded investments, that is ones that are already trading, the detail page my include information such as performance to date, current share price and a link to trade shares in that investment.

In block 215, a request to purchase a particular investment may be received. This may comprise receiving an indication of the actual investment (e.g., Miami condo), the number of shares, the per share price as well as indication of the intended purchaser, that is who's rewards account to debit to cover the purchase price. This may comprise confirming that the intended purchaser has a sufficient amount of accumulated rewards currency to make the requested investment. If, after selling the requested number of shares to the investor, there are remaining shares in that investment, than a number of available shares may be reduced to reflect the most recent purchase. If, however, there are no more remaining shares, that is the investment is fully funded after the most recent share purchase, operation may proceed to block 220 where the underlying investment is purchased. The back end operation that occurs in block 220 will depend on the nature of the investment. In various embodiments, this may comprise transferring a balance to an investment purchase account. This account may then be used by the card issuer to purchase the investment asset. This may also comprise sending an email, wire transfer, electronic funds transfer (EFT), or other indication of a desire to purchase to a seller of the particular investment asset. Varying degrees of human assistance may be required to perform the operations in block 220 depending upon the nature of the investment. As is known in the art, investments in non-tangible assets are more likely to be facilitated through automated methods.

Figure 3:
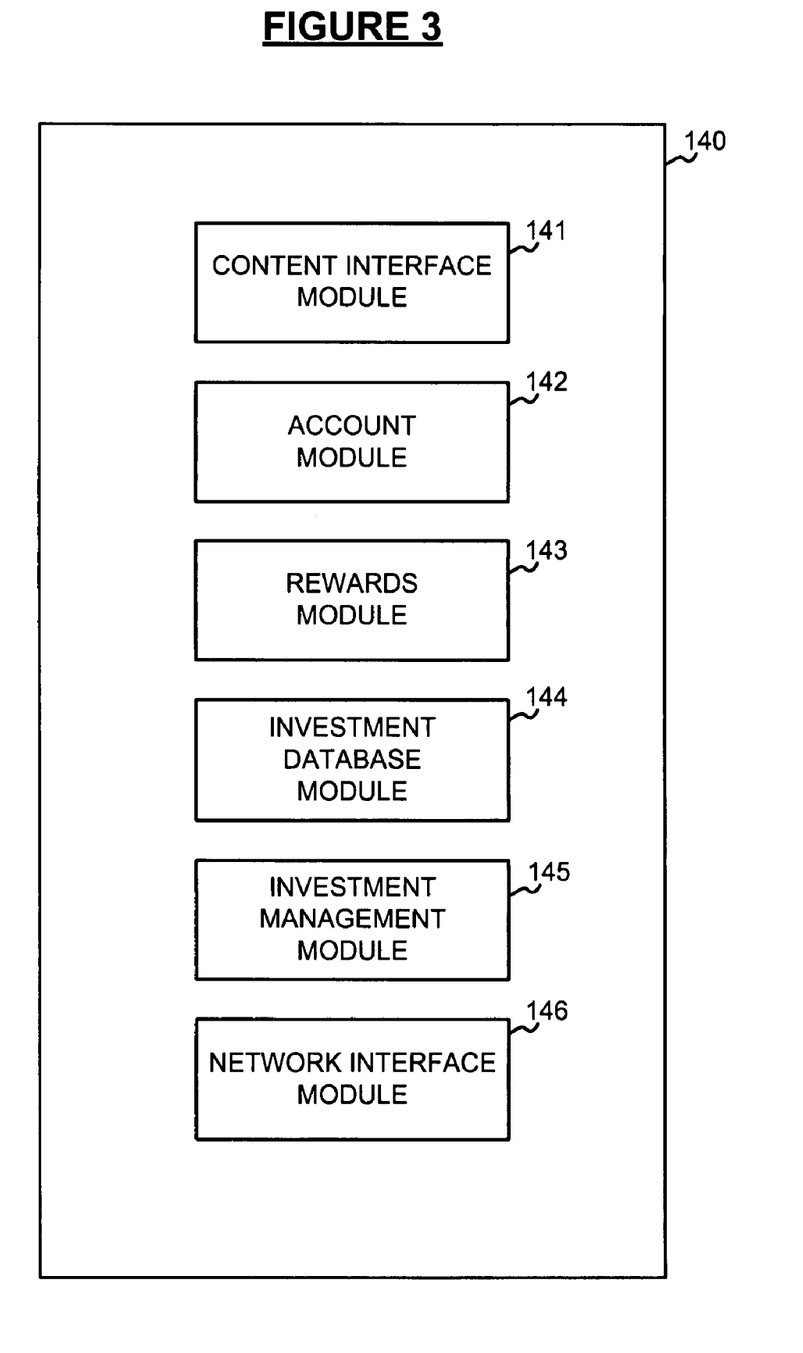
FIG. 3 is a block diagram illustrating the components of a network-based investment management system for facilitating purchase reward investment communities accordance with at least one embodiment of the invention.

Referring now to FIG. 3, this Figure is a block diagram illustrating the components of a network-based investment management system for facilitating purchase reward investments in accordance with at least one embodiment of the invention. The system 140 may comprise various modules which may provide functionality for facilitating rewards-based investments over a communication network.

In the example of FIG. 3, a content interface module 141, an account module 142, a rewards module 143, an investment database module 144, an investment management module 145, and a network interface module 146 are shown. It should be appreciated that each module 141, 142, 143, 144, 145, and 146 may be configured as a software application executing on computer hardware, an application specific integrated circuit (ASIC), a combination of hardware and software, combinations of these, or other suitable configuration. Moreover, one or more modules 141, 142, 143, 144, 145, and 146 may be combined or broken into multiple additional modules. Furthermore, modules different than the exemplary ones depicted in FIG. 3 may be used with the various embodiments of the disclosure.

The network interface module 146 may comprise a network interface card, wireless interface card, wireless broadband card, etc., and corresponding device drivers that may enable two-way communication between microfinance system and customers of the system over a network such as the network 115 shown in FIG. 1, using a packet-based communication protocol or other suitable protocol.

In various embodiments, the content interface module 141 may comprise an application program interface (API) for interacting with a software client executing on computing devices associated with the plurality of rewards recipient account holders 110-1, 110-2, 110-3, . . . , 101-N. For example, the content interface module 141 may comprise a network interface front end, such as a web server front end, for providing security and log in functions. The content interface module 141 may also provide the interface to the functionality of the system 140 in one or more network browser compliant formats such as HTML, JAVA, XML, etc. Thus, when a reward recipient account holder access the investment management system 140 via the network, and a page request is received, the content interface module 141 may output the page to the consumer via the network interface module 146. In various embodiments, the content interface module 146 may provide content in the form of an online account interface. That is, the content interface module 141 may present to customers information from the account module 142 such as a current account balance, electronic statements, transaction history, bill payment, etc., in a format compatible with a browser or other network interface client The content interface module 141 may also provide reward information to account holders from the rewards module 143. For example, the content interface module 141 may provide a menu or other data structure that includes a link to view rewards information, such as, for example, a rewards balance, a rewards statement (e.g. purchased rewards earned in a current transaction period). The content interface module 141 may also provide account holders with link to shop for products with rewards in an associated rewards catalogue or to request a rewards disbursement in the form of a check or funds transfer. In such cases, the rewards module 143 may transfer a balance of a rewards account to an account of the card holder maintained in the account module 142.

When an account holder logs into the system 140 to access account information from the account module 142 and the rewards module 143, the user may, through one or more menu options provided by the content interface module 141, request information corresponding to investments that may be purchased through the system 140 using purchase rewards. This may cause the content interface module 141 to access the investment database module 144 to obtain information corresponding to one or more available investments and to present this information to the account holder by transferring it over the network 115 via the network interface module 146 to the account holder's computing device. If/when an account holder selects one of the investments to invest in, the system 140 may invoke the investment management module 145 to make the requested investment. As discussed herein this may comprise accessing the rewards module 142 to make sure that the account holder has enough purchase rewards to make the requested investment and to debit the account holder's rewards account accordingly. The investment management module 145 may also establish an investment account for the account holder with the purchased investment shares. The investment management module 145 may update the investment database module 144 to reflect the account holder's share purchase, thereby reducing the number of available investment shares for that investment. The investment management module 145 may cause a confirmation page to be presented to the account holder by the content interface module 141. Alternatively, or in combination, a confirmation may be mailed electronically based on contact information specified by the account holder and stored in the account module 142.

In various embodiments, an account holder may access the system 140 to trade a security that has already been funded. For example, the account holder may want to buy one or more shares in an investment from another account holder owning shares. In such cases, the account holder may be presented with an menu option by the content interface module 141 that links the account holder to the investment management module 145. The investment management module 145 may permit account holders to buy and sell shares in an investment to each other at a current share price of the investment. In such a transaction, the investment management module 145 may confirm that the seller owns the shares by checking the seller's investment account, and that the buyer has sufficient a sufficient balance of rewards currency to permit the transaction by checking the buyers' rewards account with the rewards module 143. The investment management module 145 may then debit the buyers' rewards account and credit the seller's rewards account. The investment management module 145 may keep a percentage of the transaction as a fee for facilitating the exchange.

In various embodiments, an account holder may access the system to redeem awards. For example, the account holder may desire to convert a rewards balance earned through purchases and/or through investment into cash. In various embodiments the content interface module 141 will provide a menu option allowing the account holder to perform this function. When requested the content interface module 141 may access the rewards module to obtain a current rewards balance for the account holder. As discussed herein, the rewards may be redeemed through a shopping catalogue or converted to cash. For example, the account holder may be able to redeem rewards currency for airline tickets, hotel rooms, and even tangible goods. The rewards module may store a conversion factor of rewards currency to actual dollars. For example, one hundred units of rewards currency may be equivalent to one dollar. Thus, if an account holder has a balance of 25,000 units of rewards currency, the account holder may convert this to $250. The account holder may specify that the reward account be transferred to an existing account, such as a credit card account. Also, the account holder may request that a check or prepaid gift card be issued having the $250 credit stored therein. The gift card may be a generic gift card, such as a pre-paid Visa or MasterCard, or the gift card may be specific to a partner affiliate of the institution maintaining the system 140.

Each module listed in the system 140 of FIG. 3 may operate autonomously or under the control a controller, central processing unit (CPU) or control program, such as a real time kernel of a control program of the investment management system 140 Furthermore, it should be appreciated that the particular modules illustrated in FIG. 3 are exemplary only and should not be construed as either necessary or exhaustive. In various embodiments, it may be desirable to use more, less or even different modules than those illustrated in FIG. 3.

Figure 4:
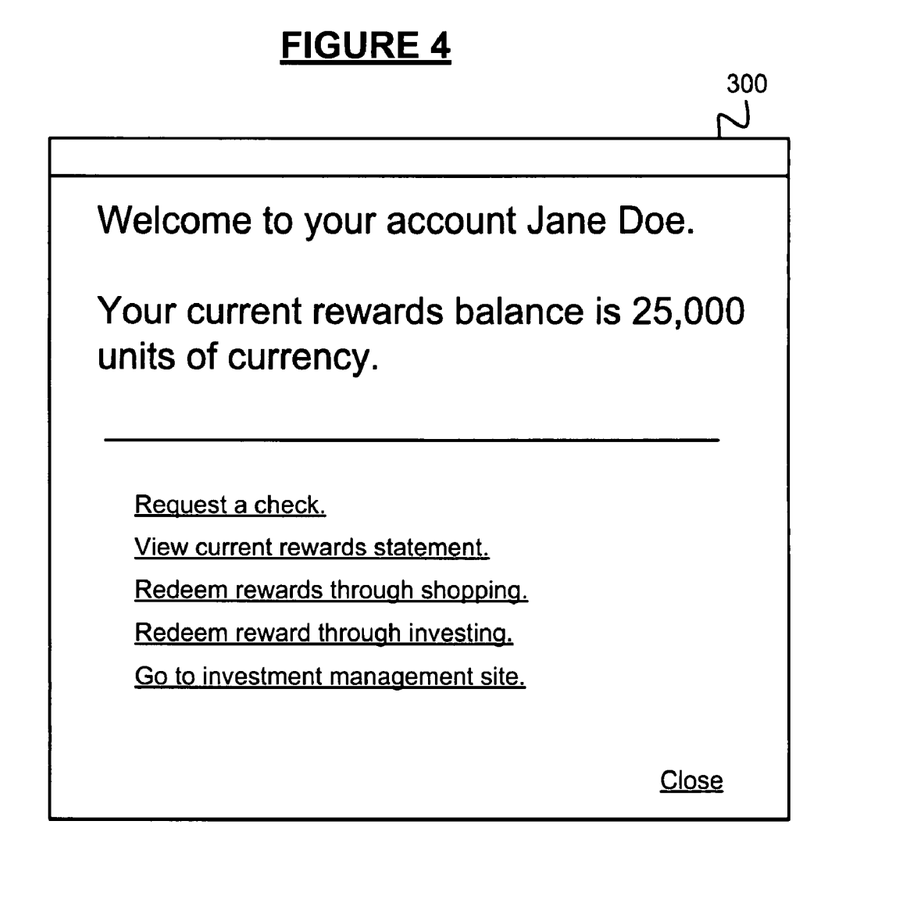
FIG. 4 is an exemplary network interface main menu for a network-based investment management system for facilitating purchase reward investment communities in accordance with at least one embodiment of the invention.

FIG. 4 is an exemplary network interface main menu screen for a network-based purchase reward investment communities in accordance with at least one embodiment of the invention. The exemplary menu screen 300 of FIG. 4 is one that may be presented to a user upon logging in to the investment management system 140 and selecting a rewards menu according to the various embodiments of the disclosure. The menu screen 300 may include a rewards total identifying a total amount of current rewards currency owned by the account holder. The menu screen 300 may include links to actions including "view a current rewards statement," "redeem rewards through shopping," "redeem rewards through investment(s)," and "go to investment management site." By selecting the "redeem rewards through shopping" option, the account holder may be taken to an online catalogue of products that can be purchased with rewards currency. By selecting the "redeem rewards through investment(s)" option, the account holder may be taken to a database of available investments, as is discussed in greater detail in the context of FIG. 6. By selecting the option "go to investment management site," the account holder may be taken to page including a menu of options provided by the investment management system, such as is shown in FIG. 5.

Figure 5:
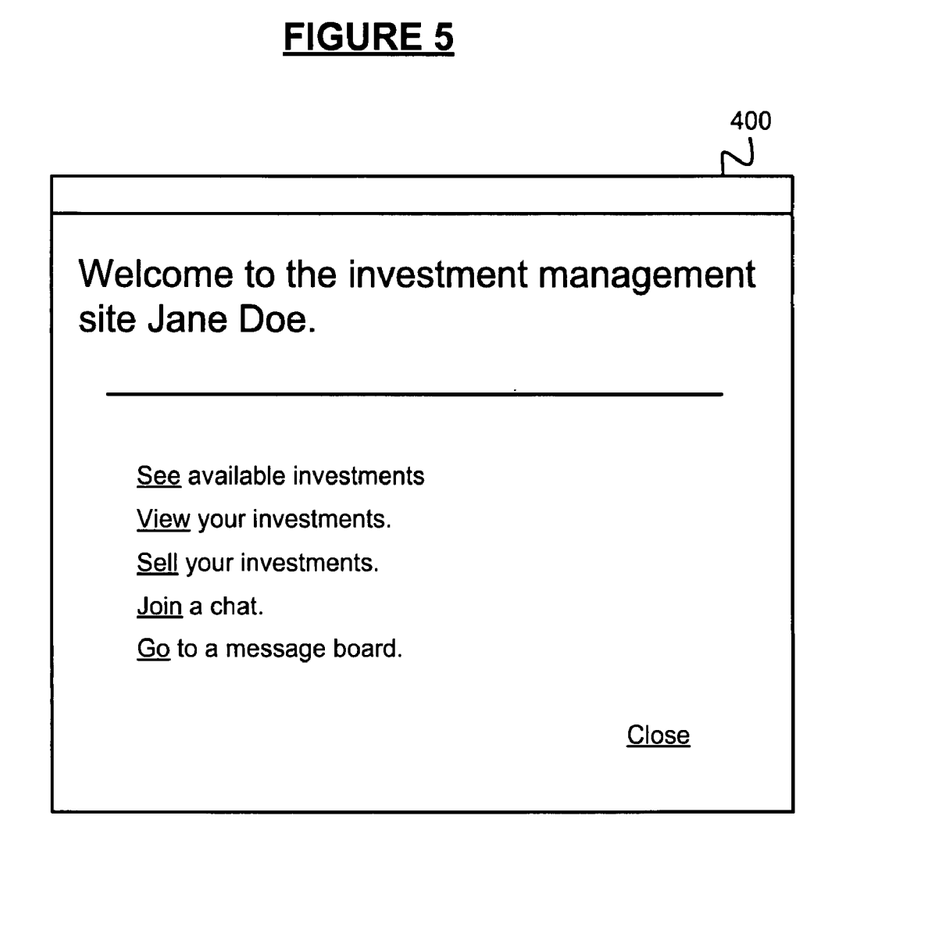
FIG. 5 is an exemplary network interface investment management screen for a network-based investment management system for facilitating purchase reward investment communities in accordance with at least one embodiment of the invention.
Figure 6:
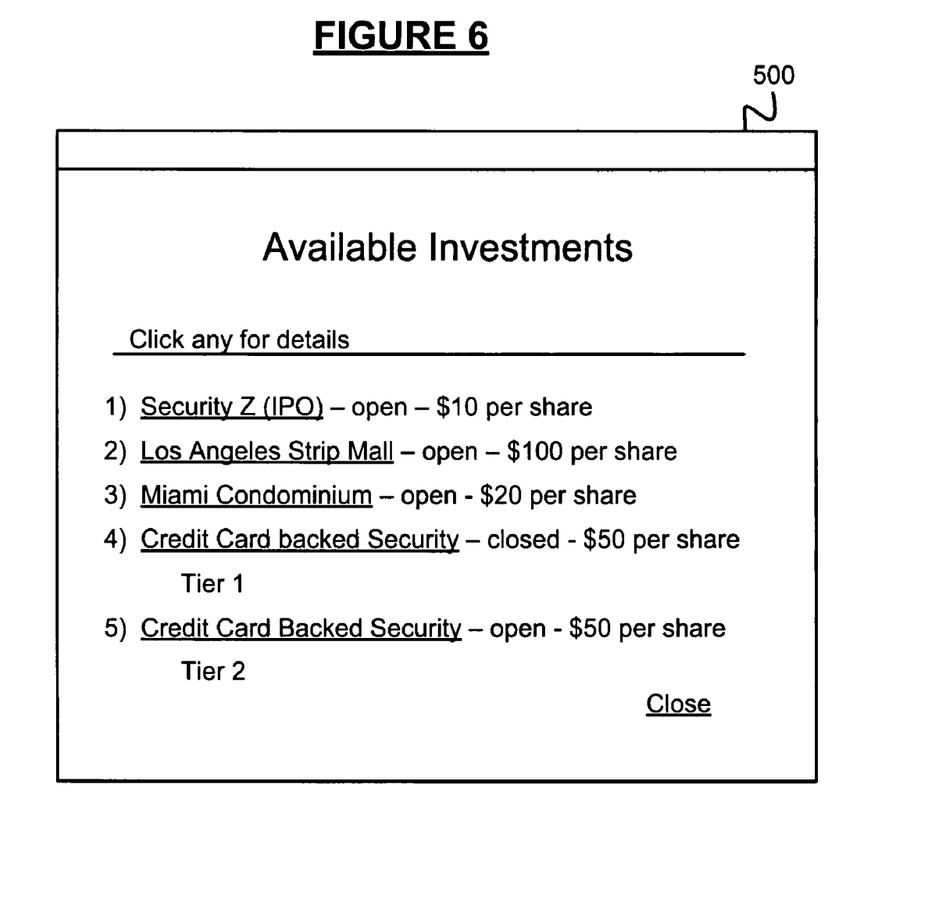
FIG. 6 is an exemplary network interface available investments screen for a network-based investment management system for facilitating purchase reward investment communities in accordance with at least one embodiment of the invention.

Referring now to FIG. 5, this Figure depicts an exemplary network interface investment management screen for a network-based investment management system for facilitating purchase reward investment communities in accordance with at least one embodiment of the invention. The screen 400 of is an example of a screen that might be displayed to an account holder in response to the account holder selecting a "go to investment management site" option off of a main menu, such as the menu shown in FIG. 4. The menu on the screen 400 includes links to "see available investments," "view your investments," and "sell shares." In various embodiments, selecting the "see available investments" option may take the account holder to page listing the currently available investments, such as is shown in the example of FIG. 6. Selecting the "view your investment(s)" option may take the user to a screen such as the screen 600 in FIG. 7. Selecting the "sell shares" option may take the account holder to a screen such as the screen 700 in FIG. 8.

As discussed above, FIG. 6 is an exemplary "available investments" screen for a network-based investment management system for facilitating purchase reward investment communities in accordance with at least one embodiment of the invention. The screen 500 of FIG. 6 lists investments that are currently available to the purchase rewards account holders. In various embodiments, the screen 500 may list each investment and provide basic information such as a description, a current share price, and a status (e.g., open, closed). Investments that have not been fully funded, that is, ones that still have unsold shares, may be designated as open. Shares in these investments may be purchased directly using one or more of the techniques discussed herein. Investments that have been funded and purchased may be identified with a status of closed. These types of investments may only be acquired by purchasing shares from another account holder. In various embodiments, each of the listed investments may include a link to an investment detail page for that investment. The investment detail page may display information such as a number of shares available for purchase, an underlying asset value, a relative level of risk, and in the case of real or tangible property, a detailed description of the property and photographs of the property. It should be appreciated that the price may be listed in actual dollars or in rewards currency. For example, a per share price may be reflected as $10, or as 1000 units of rewards currency.

Figure 7:
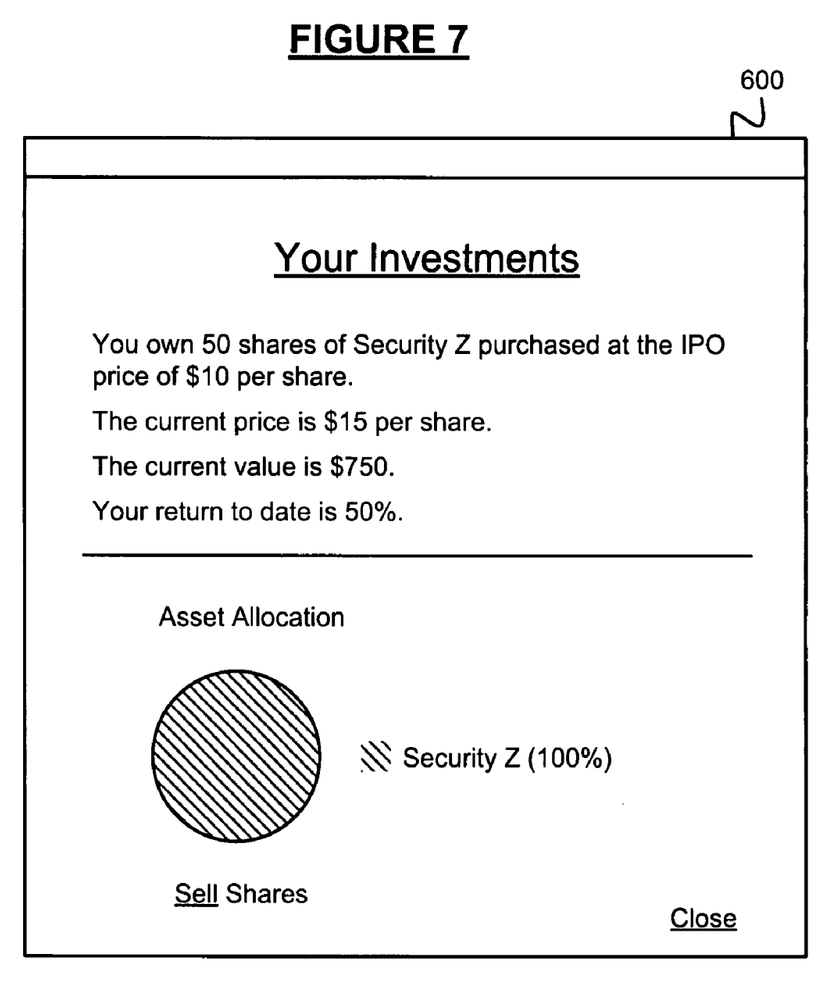
FIG. 7 is an exemplary network interface account holder investment screen for a network-based investment management system for facilitating purchase reward investment communities in accordance with at least one embodiment of the invention.
Figure 8:
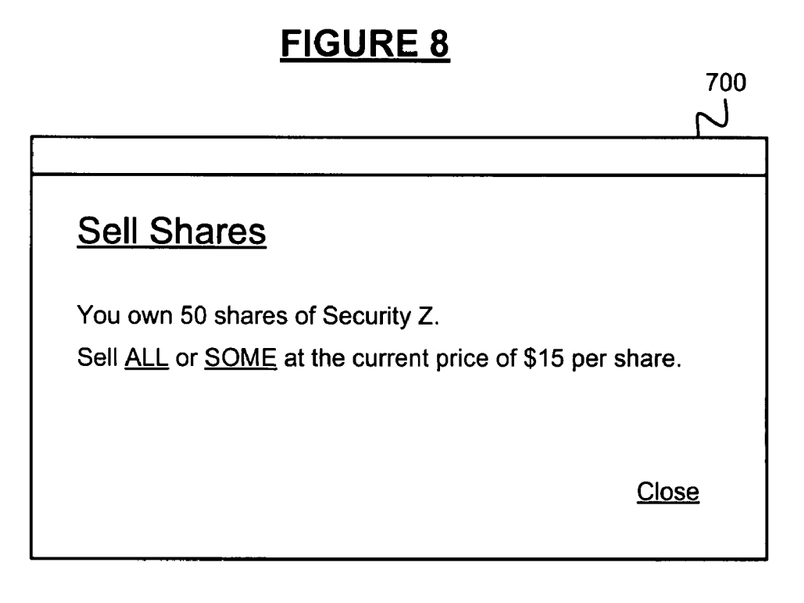
FIG. 8 is an exemplary network interface for a network-based share trading screen for a network-based investment management system for facilitating purchase reward investment communities in accordance with at least one embodiment of the invention.

As discussed above, FIG. 7 is an account holder investment screen showing the investments owned by a particular account holder. In the example of FIG. 7, the screen 600 shows that the account holder owns 50 shares in security "z" purchased at the initial public offering (IPO) price of $10 per share. The current value of the card holder's investment is $750, based on per share price of $15. A graphic shows that the 100% of the card holder's investment portfolio is allocated in this single investment. The screen 600 may also include a link permitting the user to sell shares. Selecting such a link may take an account holder to a screen such as screen 700 in FIG. 8. The screen 700 may provide input controls that allow a consumer to specify the terms of a desired sell transaction, such as the sell price, and the number of shares. Though not shown in the Figure, the seller may select one or more open buy orders from a displayed list of account holder buy orders.

Figure 9:
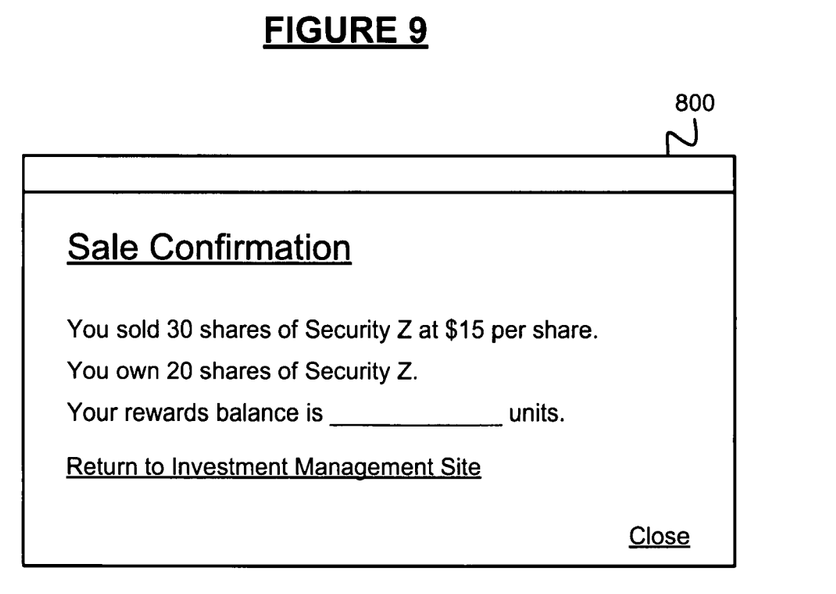
FIG. 9 is an exemplary network interface sale confirmation screen for a network-based investment management system for facilitating purchase reward investment communities in accordance with at least one embodiment of the invention.

FIG. 9 is an exemplary network interface sale confirmation screen for a network-based purchase reward investment community in accordance with at least one embodiment of the invention. The confirmation screen 800 may provide information related to the sale transaction such as a number of shares sold and a price per share, a current rewards balance that includes the proceeds of the sale. The confirmation screen 800 may also provide a link to return to the investment management screen.

The embodiments of the present inventions are not to be limited in scope by the specific embodiments described herein. For example, although many of the embodiments disclosed herein have been described in the context of systems and methods for purchase reward investment communities, other embodiments, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Many modifications to the embodiments described above can be made without departing from the spirit and scope of the invention. Accordingly, the claims set forth below should be construed in view of the full breath and spirit of the embodiments of the present inventions as disclosed herein. Also, while the foregoing description includes many details and specificities, it is to be understood that these have been included for purposes of explanation only, and are not to be interpreted as limitations of the present invention.

The invention claimed is:

1. A network-based system for allowing reward recipients to invest their rewards collectively comprising:
one or more computer processors programmed to:
provide over one or more computer networks reward information to a plurality of reward recipients, the reward information for each reward recipient comprising a reward balance associated with at least one financial account held by the reward recipient;
store information corresponding to a plurality of investments, each investment having a number of available shares, wherein each share of each investment in the plurality of investments represents a portion of a total purchase price of the respective investment, and wherein
an investment is open if it has at least one available share, and
an investment is closed if it has zero available shares;
generate one or more user interfaces on a computer display, the one or more user interfaces configured to permit reward recipients to make a selection to use at least a portion of their reward balance that is less than a total of their reward balance to be allocated shares of one or more open investments, and to permit reward recipients to make a selection to use at least a portion of their reward balance that is less than the total of their reward balance to be allocated shares of one or more closed investments from other reward recipients owning shares of the one or more closed investments;
determine that all of the available shares for at least one of the one or more open investments have been allocated by the plurality of reward recipients; and
purchase the at least one of the one or more open investments for a total purchase price when all of the available shares for the at least one of the one or more open investments have been allocated; and
one or more storage devices that store the information corresponding to the plurality of investments.

2. The system according to claim 1, wherein the one or more computer processors are further programmed to store, for each investment, an underlying value of the investment.

3. The system according to claim 2, wherein the one or more computer processors are further programmed to determine the number of available shares and a share price for each of the plurality of investments, the share price being based on the underlying value of the respective investment and being expressed in terms of an amount of reward balance per share.

4. The system according to claim 3, wherein the one or more computer processors are further programmed to maintain a current per share price for each purchased investment that is updated to reflect changes in the investment.

5. The system according to claim 3, wherein the one or more user interfaces are further configured to permit reward recipients having been allocated one or more shares of a closed investment to make a selection to sell their allocated shares to other reward recipients.

6. The system according to claim 3, wherein the one or more computer processors are further programmed to generate a performance report for each purchased investment every financial reporting period, wherein a financial reporting period is at least one period selected from the group consisting of a day, a week, a month, a quarter, and a year.

7. The system according to claim 1, wherein the investments comprise two or more investments selected from the group consisting of a single security, a piece of real property, a tangible asset, a commodity, a future contract, and an exchange traded fund (ETF).

8. A computer-implemented method for permitting reward recipients to invest rewards comprising:

providing over one or more computer networks reward information to a plurality of reward recipients, the reward information for each reward recipient comprising a reward balance associated with at least one financial account held by the reward recipient;

generating, by one or more computer processors, one or more first user interfaces on a computer display, the one or more first user interfaces configured to permit reward recipients to view details of one or more investments, each investment having a number of available shares, wherein each share of each investment in the plurality of investments represents a portion of a total purchase price of the respective investment, and wherein
  an investment is open if it has at least one available share, and
  an investment is closed if it has zero available shares;

generating, by the one or more computer processors, one or more second user interfaces on a computer display, the one or more second user interfaces configured to permit reward recipients to make a selection to use at least a portion of their reward balance that is less than a total of their reward balance to be allocated shares of one or more open investments, and to permit reward recipients to make a selection to use at least a portion of their reward balance that is less than the total of their reward balance to be allocated shares of one or more closed investments from other reward recipients owning shares of the one or more closed investments;

determining that all of the available shares for at least one of the one or more open investments have been allocated by the plurality of reward recipients; and purchasing, by the one or more computer processors, the at least one of the one or more open investments for a total purchase price when all of the available shares for the at least one of the one or more open investments have been allocated.

9. The method according to claim 8, further comprising determining a per share value for each investment in terms of an amount of purchase rewards.

10. The method according to claim 9, further comprising generating an investment performance report for each purchased investment every financial reporting period, wherein a financial reporting period is at least one period selected from the group consisting of a day, a week, a month, a quarter, and a year.

11. The method according to claim 9, further comprising determining a current per share price of a purchased investment based on an underlying value of the investment.

12. The method according to claim 11, wherein the one or more second user interfaces are further configured to permit reward recipients having been allocated at least one share in a closed investment to make a selection to sell their at least one allocated share to another reward recipient based on the current per share price.

13. A network based reward recipient investment community computer system comprising:

one or more computer processors that provide over one or more computer networks reward information to a plurality of reward recipients, the reward information for each reward recipient comprising an amount of rewards currency associated with at least one financial account held by the reward recipient;

one or more first storage devices that store information corresponding to a plurality of community investments, each community investment having a number of available shares, wherein each share of each investment in the plurality of investments represents a portion of a total purchase price of the respective investment, and wherein
  a community investment is open if it has at least one available share, and
  a community investment is closed if it has zero available shares;

an investment management module, stored on one or more second storage devices and executed by the one or more computer processors, that:
  generates one or more user interfaces on a computer display, the one or more user interfaces configured to permit reward recipients to make a selection to use at least a portion of their rewards currency that is less than the total of their rewards currency to be allocated shares of one or more open community investments, and to permit reward recipients to make a selection to use at least a portion of their rewards currency that is less than the total of their rewards currency to be allocated shares of one or more closed community investments from other reward recipients owning shares of the one or more closed community investments, and
  determines that all of the available shares for at least one of the one or more open community investments have been allocated by the plurality of reward recipients; and an investment execution module, stored on one or more third storage devices and executed by the one or more computer processors, that provides information over the one or more computer networks to initiate the purchase of the at least one of the one or more open community investments for a total purchase price when all of the available shares for the at least one of the one or more open community investments have been allocated.

14. The system according to claim 13, wherein the information corresponding to at least one community investment includes a number of investment shares associated with the at least one community investment and a price per share in a unit of rewards currency.

15. The system according to claim 13, wherein the investment management module determines a current per share price for each purchased community investment.

16. The system according to claim 13, wherein the one or more user interfaces are further configured to permit a reward recipient having been allocated one or more shares of a closed community investment to make a selection to sell one or more of their allocated shares to another reward recipient.

17. The system according to claim 13, further comprising a reporting module, stored on one or more fourth storage devices and executed by the one or more computer processors, that generates an investment performance report for each purchased community investment every financial reporting period, wherein a financial reporting period is at least one period selected from the group consisting of a day, a week, a month, a quarter, and a year.

* * * * *